United States Patent [19]
Bornstein

[11] 3,839,251

[45] Oct. 1, 1974

[54] PHENOLIC RESIN AND PROCESS FOR MAKING SAME

[75] Inventor: Leopold F. Bornstein, Tucker, Ga.

[73] Assignee: Georgia-Pacific Corporation, Portland, Oreg.

[22] Filed: June 28, 1972

[21] Appl. No.: 267,125

[52] U.S. Cl............ 260/29.3, 260/57 R, 260/57 C
[51] Int. Cl............................................. C08g 51/24
[58] Field of Search................ 260/29.3, 57 R, 57 C

[56] References Cited
UNITED STATES PATENTS

| | | | |
|---|---|---|---|
| 2,441,860 | 5/1948 | Whetstone | 260/57 C |
| 2,457,493 | 12/1948 | Redfern | 260/57 C |
| 2,489,336 | 11/1949 | Spahr et al. | 260/29.3 |
| 2,557,826 | 6/1971 | Keaton et al. | 260/57 R |
| 2,631,097 | 3/1953 | Redfern | 260/57 C |
| 3,422,068 | 1/1969 | Kreibich et al. | 260/29.3 |
| 3,591,535 | 7/1971 | Jarvi | 260/57 R |
| 3,720,642 | 3/1973 | Junger et al. | 260/38 |

Primary Examiner—Lorenzo B. Hayes

[57] ABSTRACT

A resin suitable for use in the caulless system of composition board manufacture is prepared by a controlled reaction of phenol with formaldehyde in the presence of small amounts of sodium hydroxide catalyst. One mole of phenol is reacted with from about 2.5 to 3.5 moles of formaldehyde in the presence of caustic soda catalyst to form a first stage resin having a viscosity of 150 – 300 cps at 77°F. Additional phenol in the range of 0.25 moles to 0.5 moles per mole of phenol in the initial reaction is then added as a second stage and the resin is again reacted to a viscosity of 150 to 750 centipoises. The amount of phenol added is that amount necessary to impart to particles of wood coated with the resin sufficient tack to cause them to adhere to each other and form a sheet of sufficient structural integrity and firmness to normal transfer operations in the caulless system of particle board manufacture. The resin has a pH of about 8.5 to about 10. Its cure may be accelerated by adding about 2 – 4 percent resorcinol formaldehyde resin.

12 Claims, No Drawings

PHENOLIC RESIN AND PROCESS FOR MAKING SAME

BACKGROUND OF THE INVENTION

This invention relates to a novel rapid curing phenolic resin and to composition board fabricated utilizing this phenolic resin.

Composition board is a material used in building construction that is generally composed of discrete particles of wood or wood fibers bonded together by a thermosetting resinous material. Among species of composition board are particle board, chip board, flake board, fiber board and hardboard. These species of synthetic board differ from each other primarily in the size of the particles, the density of the finished board and the amount of resin in the board.

Although this specification and the examples refer to particle board, the novel phenolic resin is not limited to particle board but has utility for composition board in general, including hardboard, fiber board, flake board and chip board, especially when these boards are made by the caulless process. In fact, fiber boards made using this resin with the older caul process have been cured at significantly lower press temperatures.

Particle board is commonly prepared from wood particles of different sizes such as, chip shavings, saw dust, etc., held together by a liquid synthetic resinous binder. The usual customary proportion of resin to wood particles is 6 to 12 percent resin solids based upon the weight of bone dry wood in the board.

Among the resins that have been employed in composition board in general, particle board in particular, are urea-formaldehyde, mixture of urea-formaldehyde and melamine-formaldehyde and phenol-formaldehydes. However, the resin currently used in predominant amounts especially in the particle board manufacturing industry is urea-formaldehyde, which is characterized by excellent bonding properties and rapid curing characteristics. During cure, the urea-formaldehyde resin gels and remains on the surface of wood particles. Accordingly, much less of the resin is used than if the resin penetrated through the wood particles. Moreover, the urea-formaldehyde resin cures in short cycles without the help of curing catalysts and can also cure at relatively low temperatures, such as 250-350°F. This ability to cure rapidly and at low temperatures enables manufacturers to produce particle board rapidly without deteriorating the wood particles due to any detrimental effect of elevated temperatures on the fibers of the wood. Because the ureaformaldehydes do not require caustic catalysts, their use is not accompanied by the detrimental effects of caustic on the fibers of the wood particles.

Despite its many advantages, urea-formaldehyde has many disadvantages which limit the overall utility of particle board made from this resin. For example, urea-formaldehyde resin has relatively low water resistance and is subject to deterioration in time when exposed to high humidity. As a consequence, particle board made with urea-formaldehyde resin can only be used in interior applications under protected and controlled conditions. Moreover, urea-formaldehyde resins have poor resistance to various bacteria. Particle board made from urea resin is subject to deterioration in time when exposed to the action of bacteria and moisture in applications such as floor underlayment. In addition, many government agencies and building codes have specifications for construction that require particle board to be of a waterproof nature to meet "exterior type" standards. Accordingly, for many applications such as flooring or decking in mobile homes, or exterior building applications particle board can not be used and exterior grade plywood is substituted.

This problem with the poor water resistance of particle board using the urea-formaldehyde resins has been recognized in the past. For example, in U.S. Pat. No. 3,440,189 the inventors substituted for the urea-formaldehyde resin a "Vinsol" resin which was reacted with a polyisocyanate.

Phenol-formaldehyde resins are known to possess excellent moisture resistance when compared to urea-formaldehyde resins. Although phenolic resins have supplanted urea resins in the manufacture of exterior grade plywood, they have made little practical impact in composition board applications, especially particleboard because of their relatively long cure time and higher temperature requirements. Moreover, at the present time much of the particle board industry has been or is being converted to the new BISON-BÄHRE-SYSTEM of caulless production of particle board. The resin characteristics for this process are so demanding that hitherto only special urea-formaldehyde resins have been acceptable.

Prior to the BISON-BÄHRE-SYSTEM or caulless system, particle board was made by spraying the resin onto the wood particles and then depositing the coated particles onto large metal cauls which supported the particles. The cauls were then inserted into a platen press wherein the resin-coated particles supported by the cauls were compressed and the resinous binder cured at pressures up to 1,000 psi and temperatures up to 400°F. The BISON-BÄHRE-SYSTEM, however, does not use cauls to support the mat but rather forms the particles into a coherent mass, mat or sheet of sufficient structural integrity and firmness that it can be cut and transferred, without support onto loaders for loading into presses for cure.

The resin requirements for the BISON-BÄHRE caulless system, or "caulless system" as it is called in the trade, are quite stringent. In order to form the coherent firm sheet having the requisite firmness and structural integrity, the resin coated particles must possess a property called "tack", i.e., the ability to stick to other resin coated particles. In order to accomplish this, the resin must gel and remain on the surface of the wood particle during the forming in pre-pressing stage. If the resin penetrates the wood particles, they will be too dry at the surface for adequate tack, will not adhere to each other and will remain discrete. As a consequence only urea-formaldehyde resins which have a tendency to gel have proven satisfactory.

Although phenol-formaldehyde resins would appear to be the ideal binders for particle board because of their moisture resistance, their curing characteristics create difficulties in particle board manufacture, especially in the caulless process. The phenol-formaldehyde resins do not gel prior to their final cure, but rather cure progressively. This lack of gel and delayed cure tends to create over-penetration of the resin into the particles of wood thereby reducing the amount of surface resin essential for proper tack characteristics. This overpenetration behavior calls for increased resin proportions and consequent higher cost. Moreover, when higher amounts of resin are used to give satisfactory bonding and tack, the board's strength is reduced and the fibers are embrittled. Resins such as those disclosed in U.S. Pat. Nos. 3,274,139 and 3,342,776 have been considered for use in the caulless process but these resins are so high in molecular weight and so high in caustic content that they overpenetrate the particles and do not give the tack necessary for adequate structural integrity. Moreover, because of their high caustic content these resins tend to embrittle the fiber of the wood upon heating in the presses.

A second important reason for the inability of known phenolic resins to compete with ureas is their relatively slow curing speed and their requirement for higher curing temperatures. Most plants in the United States which currently manufacture particle board are set-up for utilization of urea type resins. Because most presses used for urea-formaldehyde resins are not equipped for high temperature cure, a phenolic resin in order to be utilized in these same presses should have essentially the same curing characteristics as the urea resins. It would be highly desirable to have a phenolic resin which has rapid curing characteristics approaching those of the urea materials.

It is an object of this invention to prepare a phenolic resin having low penetration characteristics and excellent wetting characteristics, so that the fibers of composition board will be wet but not necessarily penetrated by the resin.

It is a still further object to produce a phenolic resin which can cure at temperatures of 250°–350°F and pressures in the range of 50–500 lbs. per square inch, with curing cycles in the range of 2–10 minutes with or without the presence of a catalyst to accelerate the rate of cure.

It is a still further object of this invention to produce a phenolic resin capable of being used in the standard caulless process for particle board production.

I have found that it is possible to formulate a phenolic resin which has curing characteristics at elevated temperatures remarkedly similar to the urea-formaldehyde resin. Moreover, this phenolic resin is capable of imparting tack characteristics to particles coated therewith, i.e., particles coated with the phenolic resin are capable of adhering to other particles with sufficient firmness to form a mass or mat of sufficient structural integrity to withstand the normal transfer operation of the caulless system.

I have achieved this new resin by a unique combination of processes, steps and raw material concentration which comprise the reacting of phenol and an excess of formaldehyde in an aqueous caustic soda solution until the formed resin has a viscosity within the range of 150 to 300 cps. (Brookfield viscosity at 77°F), preferably 175 cps to 225 cps, to form a first stage resin, then as a second stage adding additional phenol within the range of 0.25 moles to 0.5 moles, in particular 0.3 moles to 0.4 moles based upon the moles of the original phenol added in the first stage and reacting the resin to a final Brookfield viscosity of 150 to 750 centipoises, preferably 250 cps to 350 cps at a calculated solids content of 45 percent, thereafter cooling the resin to a temperature below 80°F. The amount of caustic used is in the range from about 0.16 moles to about 0.20 moles per mole of phenolic in the final resin and the final resin has a pH in the range about 8.5 to about 10 and preferably about 9 to 10.

The final resin contains phenol reacted in two stages. In the first stage the formaldehyde ratio is relatively high to form a highly reactive resin. This initial polymer is then further reacted with additional phenol. This delayed addition of phenol imparts tack, superior wetting properties and improved flow characteristics to the resin. The exact chemical effect of withholding part of the phenol and adding it as a delayed addition is not known. It is believed that the phenol added in the second stage depolymerizes the resin and prevents the formation of very high molecular weight resin. This is evidenced by an initial drop in viscosity. Regardless of the mechanism by which it works this delayed addition of phenol has been found essential for imparting tack characteristics to the resin coated particles.

In an especially preferred embodiment, the catalyst is added incrementally in the first stage. Of a total catalyst content of 0.2 moles to about 0.3 moles preferably about 0.23 to 0.25 moles of sodium hydroxide per mole of phenol in the first stage, only about one fourth of this catalyst, about 0.050 moles to 0.075 moles per mole of phenol is added in the initial charge of ingredients. The charge is warmed to about 160° and the temperature is maintained at about 160°F for about 30 minutes. The remainder of the catalyst is then added and the resin is reacted at about 160°–180°F to a Brookfield viscosity of about 200 cps. At this stage the phenol is then added and the reaction continued to the final Brookfield viscosity of 250–275 cps.

We have found that although the novel phenol-formaldehyde resin prepared with a delayed addition of phenol has sufficient tack, flow properties and lack of penetration to be usable in the caulless process, its' speed of reaction is slower than that desired for a commercially acceptable, economic substitute for the urea-formaldehyde resins now in use. This slow cure rate is caused by the combination of low resin molecular weight as measured by its low viscosity and the depolymerizing effect of the delayed addition of phenol.

Attempts to compensate for this low reaction speed by eliminating the delayed addition of phenol have resulted in resins with insufficient tack and flow properties. On the other hand reaction of the resins to high molecular weight similar to those preferred resins of U.S. Pat. No. 3,342,776 yielded resins with insufficient flow properties (even when diluted with caustic), excessive penetration, lack of tack and excessively rapid cure rate.

In order to enhance the cure rate without destroying the highly desirable tack properties, it has been found beneficial to catalyze the resin with a small but effective amount of up to 5 percent of resorcinol-formaldehyde resin. Resorcinol resins suitable for such catalyzation are described in my previous U.S. Pat. No. 3,476,706 or are obtained as RESI-LAM 117, a phenol-resorcinol-formaldehyde resin produced by the Georgia-Pacific Company. In the past it has been customary to add resorcinol itself to the phenolic component of the resin at the beginning of the reaction or to the finished resin to improve its reactivity. However, the amounts utilized are much higher than the amounts used herein. Moreover, the addition of the resorcinol itself is not as effective as the addition of resorcinol-formaldehyde resin. By using free resorcinol it is necessary first to form a resin and the resulting resin is less reactive. It is much more preferable to add a partially reacted resorcinol resin which is available for immediate reaction upon curing.

The following examples are presented in illustration of the invention and are not intended as limitations thereof;

EXAMPLE I

| Ingredients | First Stage Pounds | Approximate Molar Proportion |
|---|---|---|
| Phenol (USP) | 223.40 | 1.20 |
| Water | 236.70 | — |
| Formaldehyde (50%) | 420.20 | 3.50 |
| Caustic Soda (50%) | 45.20 | .28 |
| Phenol | Second Stage 74.50 | 0.40 |

The phenol, formaldehyde, water and about one-fourth of the caustic soda (11.30 lbs.) are charged into a reactor and warmed to 160°F maintaining this temperature to control the exotherm. After 30 minutes the remainder of the caustic soda catalyst is added and the reaction is continued at a temperature of about 160°F for an additional 30 minutes. The formed resin was then kept at a temperature of 160°-180°F to a Brookfield viscosity of 200 cps. at 77°F. When this viscosity was reached, additional phenol was added as a second stage. After the phenol is added the reaction continued to the final Brookfield viscosity of 250-275 cps. The resin is then rapidly cooled to 80°F and discharged from the kettle.

The delayed addition of the catalyst is not necessary but has been found desirable because it limits the excessive exotherm caused by the violent reaction of phenol with formaldehyde under alkaline catalytic conditions. If desired however, all the catalyst can be added during the initial charging of the reactor so long as the temperature of the reaction is so controlled that the batch temperature remains in the range of 160°F to 180°F. Reflux temperatures 200°-215°F can be used however. If the batch temperature is allowed to exceed 180°F there is a tendency in the reaction to become uncontrollable. In the event the caustic soda is added incrementally the temperature of the batch should be maintained within the range 150°F to 160°F until the first stage resin is formed. The temperature can then be adjusted to 160°F to 180°F and maintained until the resin achieves the desired Brookfield viscosity of 250-275 cps at 77°F.

The molar ratio of formaldehyde to phenol in the final resin should be desirably in the range 1.8 to 3.0 moles of formaldehyde per mole of phenol. The ratio in the first stage should be 2.5 to 3.5 moles, preferably 3.0 to 3.5 moles, formaldehyde to phenol. In addition, the amount of phenol added in the second stage should be in excess of 0.25 mole of phenol per mole of phenol in the initial stage. However, amounts in excess of 0.5 moles have a tendency to retard the cure rate of the resin. The range 0.25 moles to 0.5 moles is adequate. Preferably the amount of phenol added in the second stage should be from about 0.3 moles to about 0.35 moles per mole of phenol in the initial stage. The phenol added in the second stage should be added after all the catalyst has been added and the resin has been kept at a temperature of 160°-180°F. for a period of time sufficient for it to achieve a viscosity within the range 150 cps. to 750 cps, preferably 250 to 350 cps.

It is essential that there be a significant amount of phenol added in the second stage. The amount of phenol added must be that which is effective to impart tack to wooden particles coated therewith. By tack is meant the ability of wooden particles coated with the resin to adhere to other such particles to form an uncured, pre-pressed mat or sheet of sufficient structural integrity and firmness to withstand normal transfer operations in the caulless process for particle board.

The catalyst utilized in the reaction can be any inorganic alkaline catalyst selected from the group consisting of alkali metal and alkaline earth oxides. It is preferred to use sodium hydroxide. The sodium hydroxide is readily obtained or prepared as a 50 percent solution in water. The amount of catalyst added should be in the range 0.20 moles to 0.25 moles based upon the weight of the phenol in the initial charge or about 0.16 moles to about 0.20 moles per mole of phenol in the final resin. This yields a resin having a low pH of 8.5 to about 10. It is preferred that the catalyst be added incrementally and the amount of catalyst utilized in the first increment be in the range 0.05 moles to .08 moles per mole of phenol in the initial charge.

EXAMPLE 2

| Ingredient | Weight % |
|---|---|
| Phenol | 23.20 |
| Formalin (50% solids) | 13.63 |
| Water | 28.59 |
| NaOH (50% solids) | 21.18 |
| Formalin (50% solids) | 24.23 |
| NaOH (50% solids) | 4.74 |
| Urea | 3.93 |
| Liquid soap (30% solids) | .50 |

The phenol, formalin, caustic and water are heated to reflux for 60 minutes and cooled to 140°F. Additional formaldehyde and caustic are then added and the resin is maintained at a temperature of 110°F for 80 minutes and then at 145°F to a Brookfield viscosity of 250-350 cps. at 77°F. The resin is cooled to 110°F and urea and soap are added. The resin is mixed at 110°F for 10 minutes and cooled rapidly below 75°F. The resin has a final viscosity of 200-250 cps. at 77°F.

Upon use in particle board application, the resin evidenced no tack characteristics and was unsuitable for the caulless process.

EXAMPLE 3

A resin was made using a mole ratio of 2.5 moles of formaldehyde to 1 mole of phenol. The phenol, formaldehyde and part of the caustic were heated to a controlled exotherm of 200°F. The resin was cooled to 180°F and the resin reacted to give higher molecular weights. Additional caustic was added in three successive increments to a final concentration of 3.40 percent caustic and a resin viscosity of 100-125 cps. The resin when tested in particle board application was suitable for particle board made by the caul process but did not impart sufficient tack to the particles for use in the caulless process. The resin had poor flow properties.

The novel resin can be used to make particle board using standard techniques hitherto used with urea-formaldehyde resins. The liquid resin is used in the customary proportion of 6-12 percent resin solids based on the bone dry wood. The resin can be applied using any of the conventional techniques used in particle board. Spraying is preferred.

EXAMPLE 4

To a resin made according to example 1 having a viscosity of 550 cps and a pH of 9.2 was added 2 percent phenol-resorcinol resin (RESI LAM 117) as catalyst. The catalyzed resin was sprayed onto wood particles at about 7.4 percent resin solids based upon bone dry wood. Mats were formed having 2 face sheets and a core sheet using the standard caulless process. The mats were cured at 362°F for 6 minutes. The mats weighed 377 lbs. and had a density of 50.2 lbs. per cubic foot. When tested, the cured mats had a modulus of rupture of 2659 lbs/sq. in. After 2 hours immersion in boiling water, the mats had a modulus of rupture of 1,278 lbs/sq. in. indicating a strength retention of 48 percent.

The novel resins made by this process have application and utility not only in particle board but also in the preparation of other pressed boards and products where it is desired to utilize resin having the cure characteristics of urea formaldehyde resins.

What is claimed is:

1. A method of preparing a phenolic resin having improved curing speed, wetting properties, flow characteristics and tack imparting properties under hot press particle board molding conditions suitable for use in the caulless production of particle board, said method comprising:
   1. reacting phenol with a molar excess of formaldehyde in the range of about 2.5 to 3.5 moles of formaldehyde per mole of phenol in an aqueous medium utilizing an alkaline catalyst until the resulting aqueous resin has a Brookfield viscosity at 77°F within the range 150 cps to 300 cps to form a first stage resin,
   2. adding from about 0.25 to about 0.50 moles of phenol per mole of phenol in the reaction of step (1), said added phenol being sufficient to impart tack characteristics to wood particles coated with the resin,
   3. continuing the reaction until the aqueous resin has a Brookfield viscosity within the range 150 cps to 750 cps, and
   4. rapidly cooling the aqueous resin to a temperature less than 80°F.

2. The process of claim 1 wherein the alkaline catalyst is sodium hydroxide.

3. The process of claim 2 wherein the molar proportion of catalyst is in the range 0.2 to 0.3 based upon the number of moles of phenol initially reacted and the pH of the final resin is in the range of about 8.5 to about 10.

4. The process of claim 3 wherein the catalyst is added incrementally to prevent excessive heat build-up in the reactor.

5. The process of claim 1 wherein the molar ratio of formaldehyde to phenol in the final resin is from about 1.8 to 1 to about 3.0 to 1.

6. The process of claim 4 wherein the second stage resin is kept at a temperature from about 160°F – 180°F until the Brookfield viscosity within the range 250 to 275 cps is reached.

7. A process as recited in claim 1 wherein the viscosity range in step (1) is about 175 cps to about 225 cps.

8. A process as recited in claim 1 wherein the amount of phenol added in step (2) is in the range of about 0.30 moles to about .40 moles per mole of phenol in the initial reaction.

9. A process as recited in claim 1 wherein the molar ratio of formaldehyde to phenol in the reaction of step (1) is in the range of about 3.0 to about 3.5.

10. A phenolic resin prepared by the process of claim 1.

11. A phenolic resin prepared by the process of claim 4.

12. A phenolic resin prepared by the process of claim 6.

* * * * *